US008380594B2

(12) United States Patent
Berkman et al.

(10) Patent No.: US 8,380,594 B2
(45) Date of Patent: Feb. 19, 2013

(54) METHODS AND SYSTEMS FOR USING MULTIPLE DATA SETS TO ANALYZE PERFORMANCE METRICS OF TARGETED COMPANIES

(75) Inventors: Anthony Berkman, New York, NY (US); Seth Goldstein, New York, NY (US); Justin A Jones, Tarrytown, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 1358 days.

(21) Appl. No.: 10/972,179

(22) Filed: Oct. 22, 2004

(65) Prior Publication Data

US 2007/0265908 A1  Nov. 15, 2007

(51) Int. Cl.
*G06Q 40/00* (2012.01)

(52) U.S. Cl. .......................................................... 705/35

(58) Field of Classification Search .................... 705/35, 705/36 R
See application file for complete search history.

(56) References Cited

U.S. PATENT DOCUMENTS

| 5,761,442 A * | 6/1998 | Barr et al. .................... 705/36 R |
| 2001/0041995 A1 * | 11/2001 | Eder ................................. 705/7 |

* cited by examiner

*Primary Examiner* — Mary Cheung
(74) *Attorney, Agent, or Firm* — Rothwell, Figg, Ernst & Manbeck, P.C.

(57) ABSTRACT

New and improved methods and systems for modeling the performance of selected company metrics. Multiple, non-traditional sets of objective data along with mathematical analytical techniques are used to provide transparency and visibility into company performance relating to the particular metrics. Company inflection points and changes in strategy may be identified. The performance of a company and/or the performance of a selected industry or industry sector may be analyzed.

26 Claims, 3 Drawing Sheets

METHODS AND SYSTEMS FOR USING MULTIPLE DATA SETS TO ANALYZE PERFORMANCE METRICS OF TARGETED COMPANIES

FIELD OF THE INVENTION

The present invention relates generally to methods and systems for analyzing the performance of companies and more particularly to methods and systems for using multiple data sets to analyze selected performance metrics of selected companies.

BACKGROUND OF THE INVENTION

There are several types of analysts on Wall Street today, each producing different types of reports for different kinds of clients. One well-known type of analyst is the sell-side analyst who produces sell-side research. Sell-side analysts are employed by brokerage houses to analyze specific companies and write in-depth research reports, conducting what is sometimes called primary research. These reports are used to "sell" an idea to individuals and institutional clients. Individual investors can gain access to these reports by having accounts with the brokerage firm that generates them. For example, to get research from Merrill Lynch, one need have an account with a Merrill Lynch broker. Sometimes the reports can be purchased through a third party. Institutional clients such as mutual fund managers get research from a brokerage's institutional brokers.

A typical sell-side research report contains a detailed analysis of a company's competitive advantages and provides information on company management expertise and how the company's operating and stock valuation compares to a peer group and its industry. The typical report also contains an earnings model and states the assumptions that are used to create the forecast. Sell-side reports are updated on a regular basis as new information becomes available. Further, sell-side analysts generally make themselves personally available to meet and talk directly with buy-side analysts and potential buyers.

Information for sell-side reports may be obtained by reading the company's SEC filings, meeting with its management, and, if possible, talking with its suppliers and customers. Research may also entail analyzing the company's publicly-traded peers for the purpose of better understanding differences in operating results and stock valuations. This latter approach is called fundamental analysis because it focuses on the company's fundamentals. Such research can be a time-consuming process that limits a typical sell-side analyst to specializing in a small number of industries and covering a small group of companies within those industries. The content and nature of sell-side reports may be limited by government SEC regulations.

A second type of analyst is the buy-side analyst. Buy-side analysts are employed by fund managers and pension funds. Like sell-side analysis, a buy-side analyst specializes in a few sectors and analyzes stocks to make buy/sell recommendations. Buy-side researchers typically differ from sell-side researchers in various respects: they follow more stocks (30-40), they write very brief reports (generally one or two pages), and their research is only distributed to fund managers—not to sell-side analysts or to investors at large. Further, while sell-side analysts are limited to reporting on companies that their brokerage represents, buy-side analysts are not thus limited. In fact, buy-side analysts constantly work to identify and report on companies that they expect to be of current interest to their customers. Readers will understand that different buy-side analysts use different criteria for identifying 'hot' companies.

A buy-side analyst can cover more stocks than a sell-side analyst because they have access to more information, including sell-side research. They also have the opportunity to attend industry conferences, hosted by sell-side firms.

While company fundamentals are widely accepted indicators of a company's performance, fundamentals of publicly traded companies are generally available to everyone. Much of the added value of buy- and sell-side research comes from the 'other' data included in such research. In some instances, commercially available, analytical data is used by analysts as part of their reports. For example, Nielsen™ provides data relating to consumer audiences in the internet, media and entertainment industries. NPD provides point of sale data in the video game industry as well as data relating to food services, apparel and appliances. IDC provides data relating to the information technology and telecommunications industries, while IRI provides data relating to point-of-sales activities in various industries including consumer goods. Yet another source of data comprises the industry standard practice of collecting data by performing deep, automated searches of publicly available data sets, such as those available on the Internet. These and other well-known data sources are available to analysts in developing buy- and sell-side reports. While such data is useful and interesting in certain respects, it also has certain drawbacks. For example, such analytical data sources are relatively limited in number. The data available from such sources is generally determined by the collector as pertinent to an industry and may not be particularly useful with respect to any particular company within that industry. An analyst may be lucky to find one set of data having limited relevance to a particular company of interest.

Beyond fundamental analysis and the use of commercial analytical data, the remainder of data included in most analyst reports tends to be anecdotally based and/or quite subjective to the personal opinions of both the analysts and users. This means that, despite analysts' best efforts, much buy- and sell-side research suffers from the disadvantages of being anecdotal and subjective.

Because significant investments are made based upon analyst reports containing, in large part, anecdotal and subjective data, reliance upon such reports exposes the consumers of such data to risks and the providers of such data to potential liability. The present inventors have determined that it would be highly desirable to develop new ways of analyzing company performance, in addition to fundamental analysis, that is based on objective mathematical analysis. Such analysis would desirably be based on proven and repeatable objective principals and would not be subject to the vagaries, inconsistencies and subjective-ness of existing buy- and sell-side analysis.

SUMMARY OF THE INVENTION

In accordance with an embodiment of the present invention there are provided methods and systems for using multiple sources of pertinent, measurable data to analyze selected performance metrics of selected companies. Such data, while not fundamental performance data, can provide significant, objective insight into the current and future performance of relevant company metrics. Company metrics which may be analyzed using the current invention are not limited to financial performance, but include many other measures of interest to investors as described below. The use of multiple data sources enables the analyst to mathematically interpret the information developed using the various data sets to improve the accuracy of the analyses. Analyses provided by the present invention thus provides transparency into the activities and performance of a selected company, including but not limited to, in various instances: provide the ability to evaluate past company performance intelligently, identify strategic and tactical shifts in a company's performance and in some instances to forecast a company's future performance.

In accordance with the invention there are provided methods and systems for preparing a model to analyze a performance metric of a selected company, one exemplary method comprising: identifying a first data source having a first set of data pertinent to the performance metric of the selected company; collecting into the computer the first set of data; validating the first set of data; identifying an additional data source, the additional data source having an additional set of data different from the first set of data and pertinent to the performance metric of the selected company; collecting into the computer the additional set of data; validating the additional set of data; combining the first set of data and the additional set of data in a combined data set; selecting an analytical process to apply to the combined data set; applying the selected analytical process to the combined data set to develop a model of the performance metric; and validating the model of the performance metric against the actual performance of the selected company.

The present invention has the significant advantage of providing entirely new sources of objective analysis for company reports. Because data can be obtained from a vast selection of sources, more varied and reliable analysis of company performance can be provided to users. Users need no longer make significant investment decisions based heavily upon limited and/or anecdotal data and subjective interpretation by analysts.

DESCRIPTION OF THE DRAWING FIGURES

These and other objects, features and advantages of the invention will now become apparent from a consideration of the detailed description of the invention as set out below when read in conjunction with the drawing Figures, in which.

DETAILED DESCRIPTION OF THE INVENTION

There will now be shown and described new and improved processes and systems for analyzing the performance of a company. As used here, the term "performance of a company" refers to any metric of a company selected by an analyst as of interest to an investor. Performance may thus include, metrics relating to: financial performance, customer base, product set, cost of goods, cost of advertising, geographical activities, and other metrics of interest to investors in a company. Unless expressly stated otherwise, examples and lists of alternatives as used herein are without limitation.

As will be shown below, the present invention uses multiple, non-traditional data sets to provide transparency of or visibility into the selected performance metric of the company. Because objective data sets are used in the evaluation of a company's performance, the resulting analysis is generally objective and mathematically repeatable in comparison to the subjective or anecdotal evidence often used by buy- and sell-side analysts. Further, because multiple data sets are used to perform the analysis, the accuracy of the analysis is significantly improved as described herein below.

Figure 1:
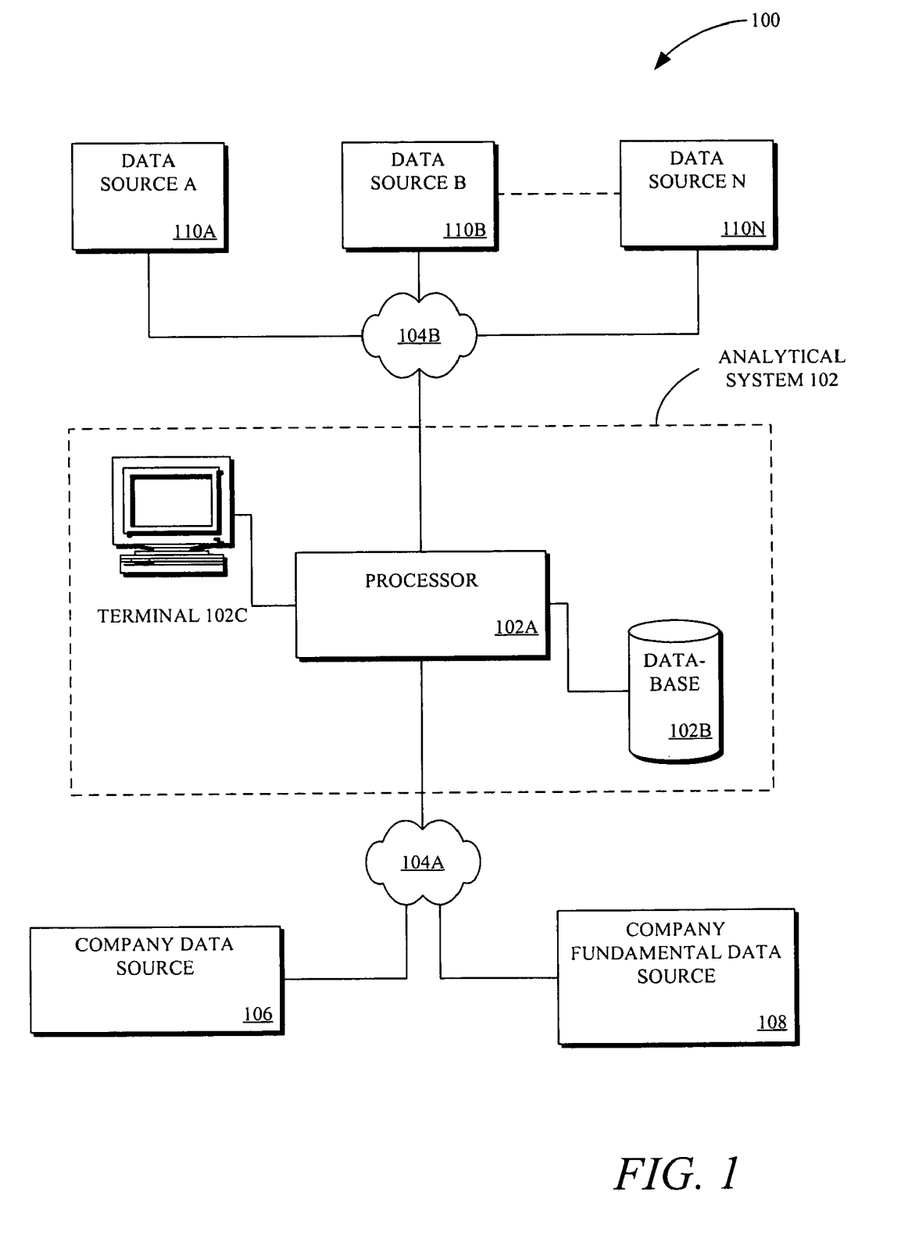
FIG. 1 is a block diagram of a system constructed in accordance with the present invention.

With reference now to FIG. 1, there is shown a system 100 including an analytical system 102 operative in accordance with the processes described below to analyze the performance of selected metrics of selected companies. Analytical system 102 is seen to include a processor 102A connected to a database 102B and an operator terminal 102C. In one exemplary embodiment, processor 102A includes an Intel™ microprocessor operated by a Microsoft™ Windows™ operating system. Database 102B comprises an appropriate combination of memory elements, for example a combination of magnetic, optical and semiconductor memory elements. Terminal 102C comprises a conventional keyboard and display screen. While one exemplary system has been described, numerous other systems including combinations of processors, operating systems, memory, software, databases and operator terminals will now be apparent to the reader, which are capable of performing the invention as described herein.

Processor 102A is seen connected through an appropriate communications channel 104A to a traditional data source 106 for an identified company, such as those data sources described herein above, as well as to a source of fundamental data 108 for the same company. The processor is similarly connected through an appropriate communications channel 104B to a plurality of non-traditional data sources indicated at 110A, B, N. Communications channels 104A, B can comprise, for example, telephone, facsimile, mail and/or public or private network connections of types well known to the reader. Traditional data source 106 comprises one or more commercial data suppliers as are described above, while company fundamental data source 108 may comprise the company under analysis itself, or other well-known sources of fundamental data. Exemplary sources of non-traditional data 110A-N are described in detail herein below.

Figure 2:
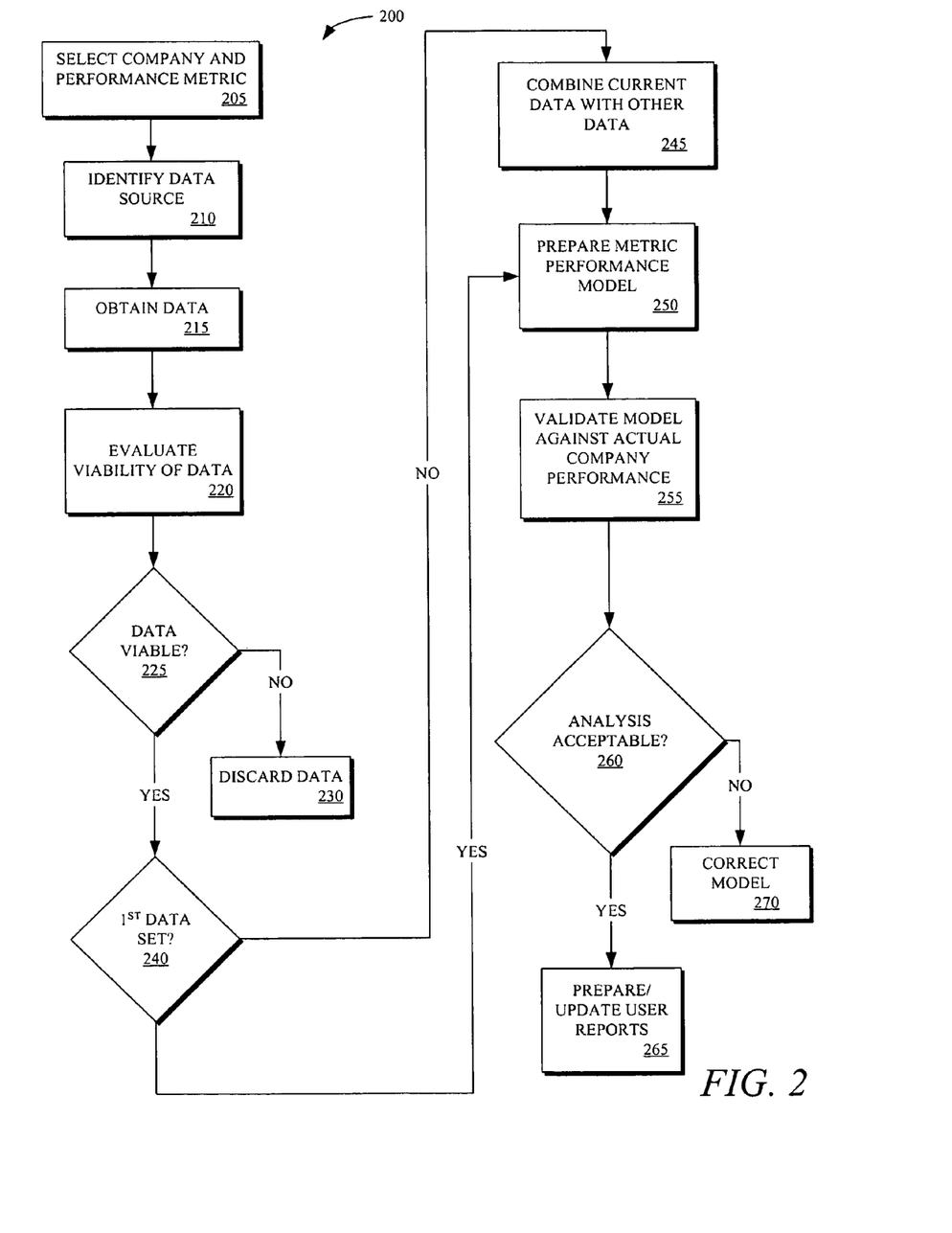
FIG. 2 is a flow chart showing a process for analyzing the performance of a company in accordance with the present invention.

With reference now to FIG. 2, a process 200 is shown for analyzing data to evaluate and model one or more performance metrics of one or more selected companies. In the exemplary embodiment, the processes described herein are performed by analytical system 102, processor 102A operating, for example, commercially available computer programs such as: Microsoft™ SQL Server, The Mathworks™ MATLAB software including the statistical analysis, neural network and spectral analysis modules, Microsoft™ Data Analyzer and other data handling and analysis programs as are known in the art.

Initially it is necessary to identify a selected company and the performance metric or metrics to be analyzed for that company (step 205). For purposes of illustrating the present invention, process 200 will initially be described with respect to the analysis of the performance of a fictional, publicly traded, national used car dealership, referred to herein as Autostore. Potential investors in Autostore would like more information about the company. These investors have access to publicly available data from traditional data sources 106 and fundamental data source 108, in this case company SEC reports available from many commercial sources. However, the investors would like further insight into the operation and performance of Autostore prior to making an investment decision. An analyst operating analytical system 102 determines that the company performance metric of unit sales, in this example unit auto sales, would be of value to the potential investors and determines to operate analytical system 102 to provide visibility into that aspect of Autostore's performance.

With continuing reference to FIG. 2, exploration is performed to identify a first source of data likely to provide insight into Autostore's unit sales (step 210). In this instance, it is determined that a first data source, a source of multi-state automobile registration data, is available through licensing of the data from a governmental agency for use by analytical system 102. The data set includes, for each state, demographic data on each automobile's registrant, year and model data on each automobile and geographic data on the location of each registered automobile. In accordance with the present invention, this first data set comprises certain characteristics: i) it is not fundamental company data, ii) while not fundamental data, it is objective and not anecdotal in nature, and iii) it is available for use, in this case through licensing, by analytical system 102. Of particular interest in the licensed data set is the number of monthly title registrations for Autostore, available for a period of 8 historical quarters, that is, eight, 3-month historical periods.

Figure 3:
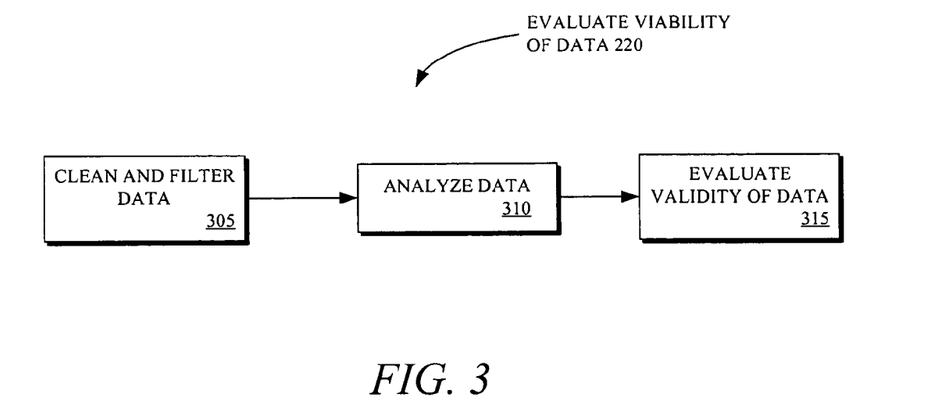
FIG. 3 is a flow chart showing the details of the data validation process of FIG. 2.

The data is licensed and imported into analytical system 102 (step 215) and its viability is evaluated (step 220). More particularly, it is known that no data set is likely to be without problems, such as completeness and accuracy, which may impact its use. With reference now to FIG. 3, the viability of the data set is determined by first cleaning and filtering the data to remove obvious bad and/or incomplete data entries or other data entries that can be determined to be inappropriate in their content (step 305). The data is then analyzed (step 310) to determine its validity (step 315).

In the present example such analysis includes evaluation of the completeness of the data across all relevant geographies and the completeness of the entries within the particular registration fields of interest. As noted above, the data to be used relates to registrations arising from unit auto sales by Autostore, particularly the date and seller fields by which Autostore registrations are determined. Further in the current example, it is determined that the registration data, and particularly the registration dates, suffer a latency error caused by the lag between the purchase date and the registration date for a typical automobile sale. This latency error is corrected, for example using survey data to determine an average latency period. Optionally, more complex and sophisticated cleaning can be done, for example adjusting the latency differently for different dates, geographies, types of vehicles and such other factors as may be determined and corrected. It will be understood that the process of determining the viability of a data set will vary from data set to data set. However, in each case the process will include cleaning the data, as well as determining the overall fitness of the data for the intended purpose. Usability factors will vary from data set to data set, but will likely include such parameters as accuracy, completeness, integrity, 'cleanliness' and other factors going to its validity, but not its usefulness for analysis of unit sales, which is determined below.

Figure 4:
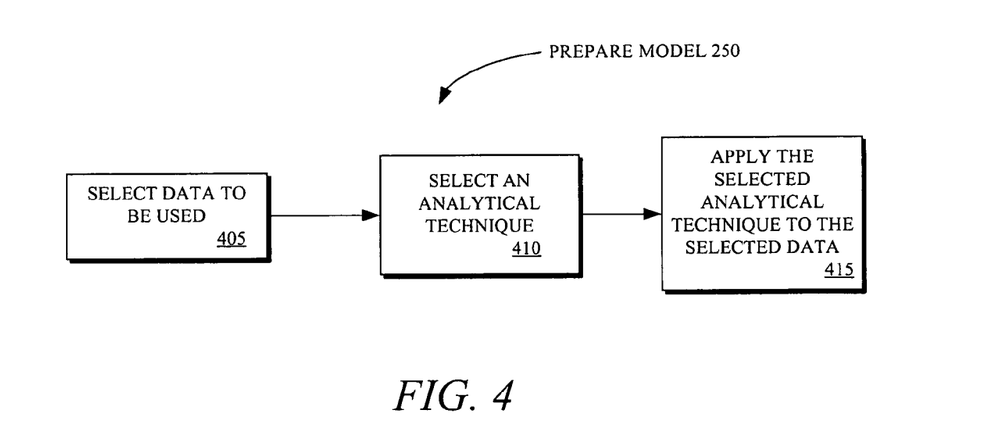
FIG. 4 is a flow chart showing the details of the data analysis process of FIG. 2.

With reference back to FIG. 2, if the data is not viable (step 225) it is discarded (step 230) and the process re-started from step 210. If the data is viable (step 225) and comprises the first data set to be used to generate the metric model (step 240), then it is processed with the goal of using it to analyze, through modeling, the selected performance metric of the selected company (step 250), in this case the unit sales of Autostore. With reference to FIG. 4, an analysis and modeling of the selected data includes first selecting the data to be used (step 405). In the present instance, much data is available in the vehicle registration database. As noted above, the registration date and seller data is selected for use, preferably cleaned and validated in the manner described above.

Next there is selected a mathematical analytical technique to be applied to the data (step 410) with which to construct a model for the translation of data as a proxy for the metric of interest. It will be understood by the reader that numerous analytical techniques can be used to analyze the date and seller data of registered vehicles whereby to model the unit sales of Autostore. The invention contemplates the use of various analytical techniques including, but not limited to, linear regression analysis, multivariate (nonlinear) regression analysis, time series analysis, smoothing methods, spectral analysis, neural networks, artificial intelligence and machine learning as well as a myriad of other analytical and predictive techniques as will now be apparent to the reader.

It will be understood by the reader that neural networks comprise commercially available, artificial intelligence models that operate by attempting to imitate the way a human brain works. Rather than using a digital model, in which all computations manipulate zeros and ones, a neural network works by creating connections between processing elements, the computer equivalent of neurons. The organization and weights of the connections determine the output. Neural networks are understood to be particularly effective for predicting events when the networks have a large database of data to draw upon. Numerous, commercially available neural network software packages are available including, but not limited to: neuralware™, Siebel™, microstrategy™ and others known to the reader. Numerous other commercially available software, examples of which are named above, are similarly available to perform the described regression and spectral analyses.

With reference back to FIG. 2, because the correspondence between registration data and unit sales is anticipated to be relatively strong, the system operator may begin with a linear regression analysis. If this is the first data set used for the analysis (step 240) then the process continues with step 250 wherein a mathematical model is prepared based upon the previously described mathematical processing. The reader will understand that the model comprises a mathematical formula arising from the analytical technique applied to the selected data, in the described example a mathematical formula arising from the linear regression analysis.

The developed model is then compared to the actual performance of the company (step 255) to determine its accuracy. Such comparison may be to the historical, current and future performance of the company, typically as available directly from the company or from a commercial data provider of the type described herein above. If the model is accurate (step 260), then customer reports based on the model are generated (step 265) and distributed similar to buy- and sell-side analyst reports. As will be understood by the reader, acceptable accuracy is determined by the operator of analytic system 102 based upon such factors as the volatility of the metric being modeled and the tightness, or range, of the company's own guidance relating to the metric.

If the model proves inaccurate (step 260), then it is corrected (step 270). With a first data set, the model may be corrected, for example, by one of several steps including but not limited to: i) further cleaning and validating of the data, ii) selection of a new analytical technique for evaluating the data and developing the model, and iii) others that will be apparent to the reader. For example, if the linear regression model of the cleaned data is inaccurate, the data may be further cleaned to remove the inherent latency errors noted above, or a more sophisticated analytical model selected, for example a non-linear analytical model. For purposes of continuing to describe the invention, it will be assumed that a linear regression analysis of the cleaned and validated data provides a model that appears to accurately predict the unit sales of Autostore.

The above-described model, while interesting, is based solely upon a single data source. In accordance with a key feature of the present invention, multiple, non-fundamental and non-traditional data sources, each pertinent to the selected performance metric, are used in combination to analyze the performance of the metric and/or to develop a model for the performance of the metric. This dual-sourcing, or triangulating, of multiple data sources across different medians functions to optimally model the selected company metric. It will be seen that the invention thus optimally proxies different factors individually, or in sub-aggregates, such that they may be combined into a model with the most robust properties. As used herein, desirable, robust properties include correct treatment of outliers, minimum variance in error terms, and other properties as will now be apparent to the reader.

As an example illustrating the use of multiple data sets, supposing that the industry of interest is casino gaming and that one metric of particular interest is monthly revenue for a particular geographic area. In accordance with the invention, the metric is disjoined into three main components of its volatility: 1) a pure growth rate, 2) seasonal effects, and 3) effects due to casino traffic trends, including the inherent correlations with occupancy. Upon extracting these factors from the data via three separate analytical procedures ranging from multivariate regression to a minimum volume ellipsoid estimation procedure there is removed all inherent information leaving what is known as white noise, effectively a randomly distributed noise with no distinguishable pattern. There is thus extracted all relevant information in the data.

Continuing now with the Autostore example, it will be assumed that inventory data for used car dealers is another data set the operator of analytical system 102 determines may be pertinent to the selected unit sales metric. It is then determined that used care inventory data is available for 9000+ used care dealers by license from an online used car lead generation service, for example Autobytel™ or Carpoint™. This data is identified as a second source of pertinent data (step 210) by the analyst operating analytical system 102 and is licensed for use (step 215) from the owner. In particular, it is determined to use monthly change in inventory data in the geographies of Autostore stores as the input data for the model to be developed.

This second set of data describing the inventory of the automobile dealerships is evaluated for viability (step 220) as described above and if viable (step 225) is used to support an analysis of Autostore's unit sales. In accordance with the present invention, because this is the second set of data (step 240) it is combined with the first set, or earlier sets if multiple sets exist, of data (step 245). That is, the new data set is combined with the date and seller registration data described above, to prepare the model of Autostore's unit sales (step 250). As described above with respect to FIG. 4, the model is prepared using a selected analytical technique whereby to generate a mathematical model. To continue the above example, it will be assumed that the correlation between the combined data set of i) monthly inventory change data for large numbers of dealerships, and ii) registration data, with unit sales by Autostore, is best determined by a complex modeling technique, for example a neural network analysis applied to the combined data set.

This second model, supplemented with the new data set and analysis thereof, is compared to the actual performance of Autostore. As noted above, such comparison can be against the historical, current and/or future performance of the company (step 255). In accordance with a feature of the present invention, the expected result is that two or more relevant data sets will provide more accurate results than a single data set. Again, if the analysis is accurate it is used to generate a report (step 265) for consumers. Otherwise, the model is corrected (step 270). As described above, correction may be made in various ways, including: i) re-cleaning and re-validating one or more data sets, ii) selecting a different mathematical analysis technique, iii) replacing one or more of the data sets with different data, iv) changing the relative weighting of the different data sets, and v) other techniques that will now be apparent to the reader.

It will be appreciated by the reader that additional data sets may be identified, collected and used to develop the model of the selected performance metric. Further, each new data set may optionally be modeled (step 250) and validated (step 255) against actual company performance, as described with respect to the first set of registration data, prior to its combination with other data sets. It will be understood that while such individual modeling and validating of a data set may be interesting, it is not determinative of how each data set is likely to, in combination with other data sets, improve the model.

As noted above, another source of data comprises the collection of data from publicly available sources such as the Internet. Such a process is known variously in the industry as "deep searching", "indexing", or using an "agent" to "extract" information from sites. More specifically, this data collection entails mapping unstructured or semi-structured data, collected in human readable formats such as HTML from web sites, into structured machine readable formats in a database. This homogenized format is then accessible to standard analysis tools. Furthermore, it provides a 'snapshot' of the information on the site at the point in time that the data was captured. This enables an analyst to observe trends in the collected data that occur over time. Generally, data collected in this manner must be cleaned and calibrated, just like the other data sources described herein.

It will be understood that automated data gathering is not limited to HTML, web sites, or even the Internet. For example, in addition to HTML, information may sometimes be accessible in XML, plain text, and CSV or other formats. The original format is typically human readable, such as HTML or plain text, but on occasion may be in a structured or semi structured format, such as XML or CSV. In addition to web sites or web servers, information may be collected from other types of sites, including "FTP" servers, email servers, instant messaging servers. Furthermore, other mediums, such as the public phone system and wireless networks, can serve as pathways for data gathering, independent of the Internet.

Other available sources of data include the use of panels, electronic surveillance, and online surveys. It will be understood that a panel is the online equivalent of a Nielsen family, excepting that instead of channels and TV programs, the medium consists of web sites and web pages. Electronic surveillance refers to the use of an electronic device, such as a computer with a camera attached, to count detectable items such as people and cars. Online surveys constitute a wide spread practice well known to the reader.

Continuing the ongoing example, it is assumed that the new model is accurate within analyst needs. In accordance with the present invention, there is thus provided an accurate model for Autostore's unit sales using two differing data sets cleaned, validated, combined and analyzed with appropriate mathematical analytical tools. In comparison to the limited sources of data and/or the subjective and anecdotal information provided by traditional analysts, the model of the present invention is based upon non-fundamental, non-traditional but objective data and repeatable, provable mathematical analysis.

For purposes of illustration and without limitation, there are provided below other examples of selected companies, performance metrics and datasets used to analyze those performance metrics:

EXAMPLE 1

Company=an online DVD rental service
Performance metric=net new subscribers
Data set I: a large panel of Internet browsers who permit monitoring of their activities in exchange for a fee
Data set II: a survey of current rental service subscribers

EXAMPLE 2

Company=an online travel service
Performance metric=gross domestic bookings
Data set I: a large panel of Internet browsers who permit monitoring of their activities in exchange for a fee
Data set II: a commercially available source of processed, anonymized credit-card transaction data

EXAMPLE 3

Company=an Internet auction site
Performance metric=Quarterly new item listings by country
Data set I: automated, online monitoring of reported new listings
Data set II: automated, online monitoring of actual auctions on the auction site In addition to analyzing individual company performance metrics, the present invention can be used to analyze the performance of entire selected industries, identifying trends, inflection points, strategy changes, performance shifts, etc. by selecting and processing appropriate industry-relevant data in accordance with the teachings herein. It will also be understood that, in addition to cleaned raw data, in one embodiment of the invention processed model data is used as input to the process, thereby using first- or lower-order model data to develop second- or higher-order models.

There have thus been provided new and improved methods and systems for modeling the performance of selected company metrics. The invention uses multiple, non-traditional sets of objective data along with mathematical analytical techniques to yield models providing transparency and visibility into company performance relating to the particular metrics. The invention is useful in many different respects, for example to identify company inflection points and changes in strategy. The invention may be applied to analyze the performance of a company and/or the performance of a selected industry or industry sector.

While the invention has been described with respect to particular embodiments, it is not thus limited. Numerous modifications, changes and enhancements within the scope of the invention will now be apparent to the reader.

What is claimed is:

1. A method for preparing a model to analyze a performance metric of a selected company, comprising:

Identifying, by a computer, a first data source having a first set of non-stock price related, non-fundamental data, pertinent to the performance metric of the selected company;
collecting, by a computer, the first set of non-stock price related, non-fundamental data;
identifying, by a computer, an additional data source, having an additional set of non-stock price related, non-fundamental data, different from the first set of non-stock price related, non-fundamental data and pertinent to the performance metric of the selected company;
collecting, by a computer, the additional set of non-stock price related, non-fundamental data;
combining, by a computer, the first set of non-stock price related, non-fundamental data and the additional set of non-stock price related, non-fundamental data into a combined non-stock price related, non-fundamental data set;
selecting, by a computer, an analytical process to apply to the combined non-stock price related, non-fundamental data set;
applying, by a computer, the selected analytical process to the combined non-stock price related, non-fundamental data set to develop a model of the performance metric; and
validating, by a computer, the model of the performance metric against the actual performance of the selected company.

2. A method operable on a computer for preparing a model to analyze a performance metric of a selected company, comprising:

a) identifying, by a computer, a first data source having a first set of non-stock price related, non-fundamental data pertinent to the performance metric of the selected company;
b) collecting, by a computer, into the computer the first set of non-stock price related, non-fundamental data;
c) validating, by a computer, by the first set of non-stock price related, non-fundamental data;
d) identifying, by a computer, an additional data source, having an additional set of non-stock price related, non-fundamental data different from the first set of non-stock price related, non-fundamental data and pertinent to the performance metric of the selected company;
e) collecting, by a computer, into the computer the additional set of non-stock price related, non-fundamental data;
f) validating, by a computer, the additional set of non-stock price related, non-fundamental data;
g) combining, by a computer, the first set of non-stock price related, non-fundamental data and the additional set of non-stock price related, non-fundamental data into a combined non-stock price related, non-fundamental data set;
h) selecting, by a computer, an analytical process to apply to the combined non-stock price related, non-fundamental data set;
i) applying, by a computer, the selected analytical process to the combined non-stock price related, non-fundamental data set to develop a model of the performance metric; and
j) validating, by a computer, the model of the performance metric against the actual performance of the selected company.

3. The method of claim 2 and further comprising the step of, for at least a selected one of the first data set and the additional data set, prior to step g), performing, by a computer, the steps of selecting an analytical process to apply to the selected data set; applying, by a computer, the selected analytical process to the selected data set to develop a model of the performance metric; and validating, by a computer, the model of the performance metric against the actual performance of the selected company.

4. The method of claim 3 wherein, if the step of validating the model of the performance metric against the actual performance of the selected company fails then discarding the selected data set and performing steps d), e), f), g), h), i) and j) for an additional data set.

5. The method of claim 2 and further including the steps of repeating steps d), e), f, g), h), i) and j), by a computer, for at least one third data set.

6. The method of claim 5 wherein at least one of the first data set and additional data sets are licensed from a third-party.

7. The method of claim 5 wherein at least one of the first data set and additional data sets are proprietary to an operator of the computer.

8. The method of claim 5 wherein the at least one proprietary data set is collected from publicly available data by an operator of the computer.

9. The method of claim 2 wherein the steps c) and f) of validating each of the first set of data and the additional set of data includes the steps of: cleaning the data to remove extraneous data; and evaluating the validity of the cleaned data.

10. The method of claim 2 wherein the selected analytical process is selected from the group comprising a regression analysis, a neural network analysis and a spectral analysis.

11. The method of claim 2 wherein at least one of the first data set and the additional data set comprises data output from a model of the performance metric.

12. The method of claim 2 wherein at least one of the first data set and the additional data set comprise data collected from a publicly accessible Internet web site.

13. A system for preparing a model to analyze a performance metric of a selected company, comprising:
  a processor;
  a memory connected to the processor and storing instructions to control the operation of the processor to perform the steps of
    a) identifying a first data source having a first set of non-stock price related, non-fundamental data pertinent to the performance metric of the selected company;
    b) collecting into the computer the first set of non-stock price related, non-fundamental data;
    c) validating the first set of non-stock price related, non-fundamental data;
    d) identifying an additional data source, having an additional set of non-stock price related, non-fundamental data different from the first set of non-stock price related, non-fundamental data and pertinent to the performance metric of the selected company;
    e) collecting into the computer the additional set of non-stock price related, non-fundamental data;
    f) validating the additional set of non-stock price related, non-fundamental data;
    g) combining the first set of non-stock price related, non-fundamental data and the additional set of non-stock price related, non-fundamental data into a combined non-stock price related, non-fundamental data set;
    h) selecting an analytical process to apply to the combined non-stock price related, non-fundamental data set;
    i) applying the selected analytical process to the combined non-stock price related, non-fundamental data set to develop a model of the performance metric; and
    j) validating the model of the performance metric against the actual performance of the selected company.

14. The system of claim 13 and further comprising the step of, for at least a selected one of the first data set and the additional data set, prior to step g), performing the steps of: selecting an analytical process to apply to the selected data set; applying the selected analytical process to the selected data set to develop a model of the performance metric; and validating the model of the performance metric against the actual performance of the selected company.

15. The system of claim 14 wherein, if the step of validating the model of the performance metric against the actual performance of the selected company fails then discarding the selected data set and performing steps d), e), f), g), h), i) and j) for an additional data set.

16. The system of claim 13 and further including the steps of repeating steps d), e), f), g), h), i) and j) for at least one third data set.

17. The system of claim 13 wherein at least one of the first data set and additional data sets are licensed from a third-party.

18. The system of claim 13 wherein at least one of the first data set and additional data sets are proprietary to an operator of the computer.

19. The system of claim 13 wherein the at least one proprietary data set is collected from publicly available data by an operator of the computer.

20. The system of claim 13 wherein the steps c) and f) of validating each of the first set of data and the additional set of data includes the steps of: cleaning the data to remove extraneous data; and evaluating the validity of the cleaned data.

21. The system of claim 13 wherein the selected analytical process is selected from the group comprising a regression analysis, a neural network analysis and a spectral analysis.

22. The system of claim 13 wherein at least one of the first data set and the additional data set comprises data output from a model of the performance metric.

23. The system of claim 13 wherein at least one of the first data set and the additional data set comprise data collected from a publicly accessible Internet web site.

24. A program product for operating a computer to prepare a model to analyze a performance metric of a selected company, comprising:
  a storage product containing instructions operable on a computer to perform the steps of:
    a) identifying a first data source having a first set of non-stock price related, non-fundamental data pertinent to the performance metric of the selected company;
    b) collecting into the computer the first set of non-stock price related, non-fundamental data;
    c) validating the first set of non-stock price related, non-fundamental data;
    d) identifying an additional data source, having an additional set of non-stock price related, non-fundamental data different from the first set of non-stock price related, non-fundamental data and pertinent to the performance metric of the selected company;
    e) collecting into the computer the additional set of non-stock price related, non-fundamental data;
    f) validating the additional set of non-stock price related, non-fundamental data;
    g) combining the first set of non-stock price related, non-fundamental data and the additional set of non-stock price related, non-fundamental data into a combined non-stock price related, non-fundamental data set;

h) selecting an analytical process to apply to the combined non-stock price related, non-fundamental data set;

i) applying the selected analytical process to the combined non-stock price related, non-fundamental data set to develop a model of the performance metric; and j) validating the model of the performance metric against the actual performance of the selected company.

25. A method operable on a computer for preparing a model to analyze a performance metric of a selected company, comprising:

Identifying, by a computer, a first data source having a first set of non-stock related, non-fundamental data pertinent to the performance metric of the selected company;

collecting, by a computer, into the computer the first set of non-stock price related, non-fundamental data;

validating, by a computer, the first set of non-stock price related, non-fundamental data;

selecting, by a computer, a first analytical process to apply to the first set of non-stock price related, non-fundamental data;

applying, by a computer, the first analytical process to the first set of non-stock price related, non-fundamental data to develop a first model of the performance metric of the selected company based upon the first set of non-stock price related, non-fundamental data;

validating, by a computer, the first model against the actual performance of the selected company;

identifying, by a computer, an additional data source having an additional set of non-stock price related, non-fundamental data different from the first set of non-stock price related, non-fundamental data and pertinent to the performance metric of the selected company;

collecting, by a computer, into the computer the additional set of non-stock price related, non-fundamental data;

validating, by a computer, the additional set of non-stock price related, non-fundamental data; and if the additional set of non-stock price related, non-fundamental data is valid, then performing the steps of:

combining, by a computer, the first and additional non-stock price related, non-fundamental sets of data to form a combined non-stock price related, non-fundamental data set;

selecting, by a computer, a second analytical process to apply to the combined non-stock price related, non-fundamental data set;

applying, by a computer the second analytical process to the combined non-stock price related, non-fundamental data set to develop a second model of the performance metric of the selected company; and validating the second model against the actual performance of the selected company.

26. A system for preparing a model to analyze a performance metric of a selected company, comprising:

a processor;

a memory connected to the processor and storing instructions for controlling the operation of the processor to perform the steps:

of identifying a first data source having a first set of non-stock related, non-fundamental data pertinent to the performance metric of the selected company;

collecting into the computer the first set of non-stock price related, non-fundamental data;

validating the first set of non-stock price related, non-fundamental data;

selecting a first analytical process to apply to the first set of non-stock price related, non-fundamental data;

applying the first analytical process to the first set of non-stock price related, non-fundamental data to develop a first model of the performance metric of the selected company based upon the first set of non-stock price related, non-fundamental data;

validating the first model against the actual performance of the selected company;

identifying an additional data source having an additional set of non-stock related, non-fundamental data different from the first set of non-stock price related, non-fundamental data and pertinent to the performance metric of the selected company;

collecting into the computer the additional set of non-stock price related, non-fundamental data;

validating the additional set of non-stock price related, non-fundamental data; and if the additional set of non-stock price related, non-fundamental data is valid, then performing the steps of:

combining the first and additional sets of non-stock price related, non-fundamental data to form a combined non-stock price related, non-fundamental data set;

selecting a second analytical process to apply to the combined non-stock price related, non-fundamental data set;

applying the second analytical process to the combined non-stock price related, non-fundamental data set to develop a second model of the performance metric of the selected company; and validating the second model against the actual performance of the selected company.

* * * * *